Patented Nov. 17, 1931

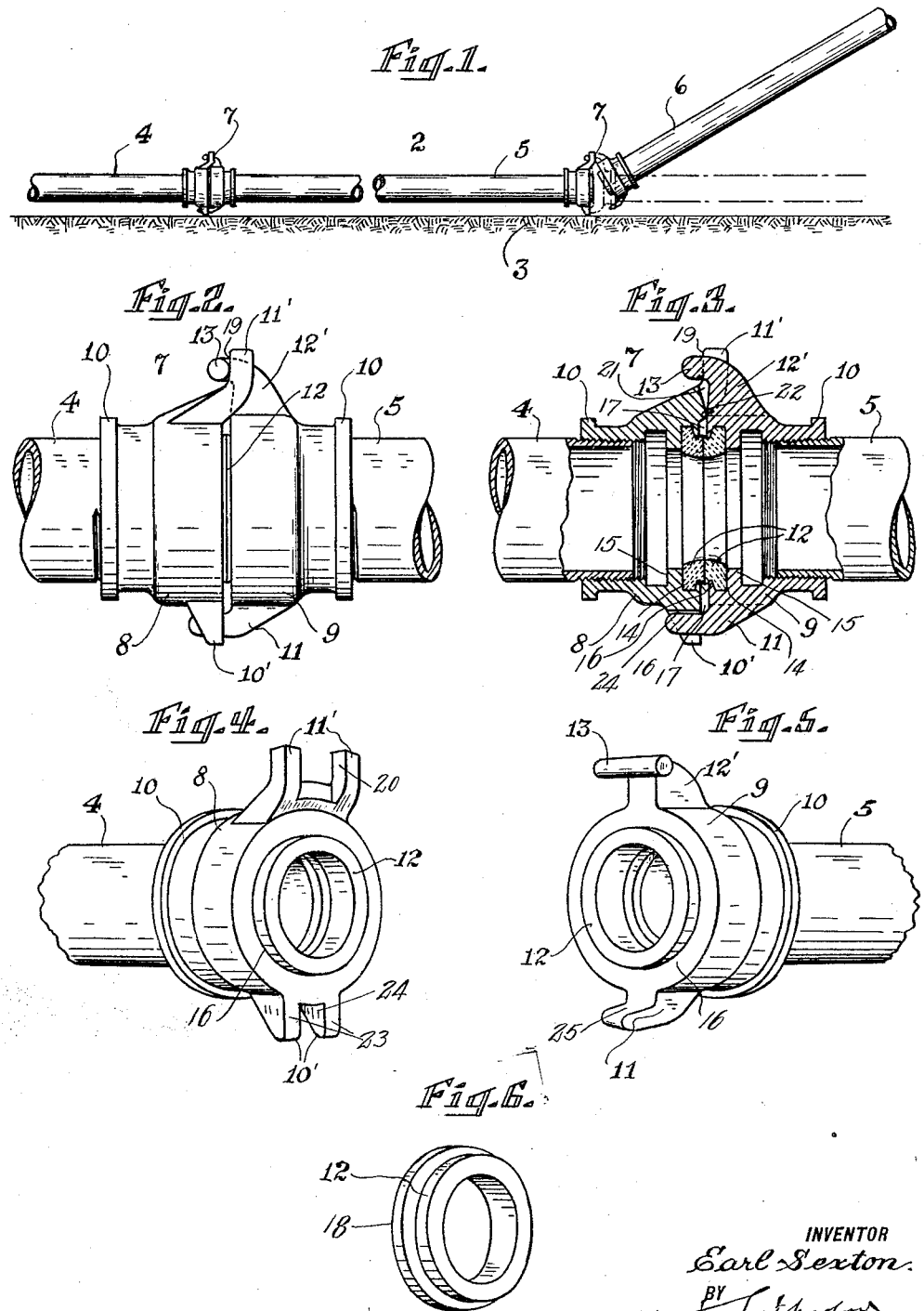

1,832,054

UNITED STATES PATENT OFFICE

EARL SEXTON, OF HARTFORD, CONNECTICUT

PIPE COUPLING

Application filed February 14, 1925. Serial No. 9,110.

This invention relates to a pipe coupling.

It has among its objects to provide an improved pipe coupling adapted to enable additional sections to be added to a laid pipe or removed therefrom with increased facility. A further object of the invention is to provide an improved fluid tight joint between adjacent pipe sections whereby, while the sections are adapted to be quickly and conveniently connected or disconnected, leakage between the sections is effectually overcome. A still further object of my invention is to provide an improved coupling having the advantages above set forth and also adapted to prevent angular displacement of one pipe section relative to another in the connecting of the sections. A more specific object of my invention is to provide an improved pipe coupling of the character set forth especially adapted to use in connection with a sprinkler system such as described in my previous Patents No. 1,164,128, patented Dec. 14, 1915, and No. 1,220,279, patented Mar. 27, 1917. These and other objects and advantages of my improved construction will, however, hereinafter more fully appear.

In the drawings accompanying and forming part of the present specification, there is represented in detail one form of embodiment of the invention which, to enable those skilled in the art to practice the same, will be set forth fully in the following description.

Referring to these drawings:

Fig. 1 is a side elevation of a structure involving the invention.

Fig. 2 is an enlarged view of a coupling.

Fig. 3 is a partial longitudinal vertical section of the construction shown in Fig. 2.

Figs. 4 and 5 are perspective views of the two members of the coupling.

Fig. 6 is a like view of a gasket.

In this illustrative construction, as in the Letters Patent hereinbefore identified, I have shown a pipe, as 2, herein placed along the ground, the pipe when used in a sprinkler system having a series of upstanding horizontally discharging spray nozzles at suitable points thereon. As shown, the pipe 2 consists of several sections 4, 5 and 6, which are coupled at their ends by improved coupling means hereinafter described.

The sections of the pipe are each coupled together by a coupling, generally designated 7, and preferably comprising two cylindrical connections or portions 8 and 9, which are provided with threaded flanges at their opposite ends 10 in such manner that they may be connected to the pipe sections. As shown herein, the portions 8 and 9 are also provided with transverse annular grooves 14 within their adjacent ends. Herein, these grooves are also provided with inner side walls, preferably in the form of annular flanges 15 of substantial height and thickness, and outer side walls, preferably in the form of thinner annular flanges 16 having their surfaces in the groove sloped to a point and their other surfaces parallel to one another and adapted to be spaced apart, as hereinafter described, by a space 17 when the two sections are brought together. In each of these grooves is also carried a lateral flange 18 on the inner end of a flanged gasket 12, preferably of compressible material such as rubber, the outer ends of these lateral flanges on the gaskets and also the bodies of the gaskets resting against the members 15 as abutments. See Fig. 3. When the parts are disconnected, the bodies of the gaskets normally assume the positions indicated in Figs. 4 and 5, with the inner ends of the bodies of the gaskets extending out a substantial amount beyond the flanges 16, as shown in those figures.

Herein, the member 8 is provided on its upper surface with a pair of forwardly and upwardly extending laterally spaced projections or lugs 11' having flat back surfaces 19 in the same plane and parallel surfaces 20 on their adjacent sides at right angles to the surfaces 19. The member 9 herein also carries on its upper surface an upwardly extending member 12' having a transverse rounded extension or cross bar 13 on its end extending to each side of the member 12' and longitudinally beyond the latter. The construction thus is such that the member 13 may pass downward in back of the lugs 11' and engage the surfaces 19 (Figs. 2 and 3), with its ends against the backs of the projections 11', while the portion 12' will pass down quite snugly between the lugs 11' as the section carrying the portion 9 is moved angularly relative to that carrying the portion 8, i. e. from the full-line position of Fig. 1 to the dotted line position therein. Herein it will also be noted that the base of the slot between the members 11' is preferably extended downwardly and angularly as shown at 21, to permit free downward movement of the member 12', and that an abutment 22 at the base of the slot engages the member 12' near its base to limit the bringing together of the parts while providing the space 17.

In a preferred form, I also provide means on the lower side of each element of the coupling which cooperate with the upper means just described. These means on the member 8 herein assume the form of spaced guide lugs 10' extending downward from the bottom of that member. Further, it will be noted that herein these members, while they may be generally similar to the members 11', have their inner surfaces 23 substantially in the plane of the surfaces 19 on the members 11', and that they only have a horizontal slot 24 between them. The means on the member 9 also assume the form of a single downwardly and then longitudinally extending lug 11 formed on the bottom of the member 9 and provided with an upper portion 25 slightly longer than the member 12'. This lug 11 is herein also adapted to pass quite snugly between the lugs 10' when, after the connection of the parts 11', 13, the member 9 is moved angularly with respect to the member 4 about the back of the lugs 11' as a pivot.

In the use of this illustrative form of my invention, when it is desired to extend the pipe line, the new section, as for example 6, is brought into the angular relationship relative to the already laid section or sections which is shown in full lines in Fig. 1, with the part 13 in back of the lugs 11' and the part 12' extending between these lugs. The pipe section 6 is then lowered toward the dotted line position. As the same is lowered, it will be noted that the adjacent end surfaces of the two gaskets come into contact in such manner that each is compressed axially from the normal or uncompressed position shown in Figs. 4 and 5 to the compressed position shown in Fig. 3, the same thus being firmly united along a line in the plane of the surface 19. Here it will also be noted that the two gaskets are enabled to come together without creeping one relative to the other, and that they are caused to bulge inwardly, and do so as shown in Fig. 3. While the section 6 is being lowered it will also be noted that the member 11 enters between the lugs 10', the latter thus acting as a further guide during the connecting operation and proper entry of the lug 11' between the lugs 10' indicating that the parts are properly alined.

Obviously, when the section 6 is once lowered its weight serves to hold the parts securely together without the need of other locking means, the two gasket construction also being such that the weight is sufficient to maintain a fluid tight joint therebetween. It will also be evident that the two sets of interengaging portions above and below the joint serve to locate the section 6 in the desired angular position relative to the other sections so that each of the nozzles occupies the desired vertical position relative to the ground. When it is desired to disconnect the sections, a reverse operation is gone through, the member 6 then simply being raised from the dotted line position to the full line position shown in Fig. 1 and lifted off bodily, without the necessity for any unlocking or special manipulation.

As a result of my improvement, additional sections of pipe may be added to a pipe line very quickly and conveniently and be definitely located in the desired angular relation to the preceding sections by even the most unskilled laborers, at the same time that a fluid tight connection is obtained and maintained by the weight of the pipe sections. Through the use of my improved construction it will also be noted that it is made unnecessary to machine the parts, the connections between the parts including the mountings for the two gaskets being such that ordinary castings may be used without the necessity for machining, with a consequent substantial reduction in cost. These and other advantages of my improved construction will, however, be clearly apparent to those skilled in the art.

While in this application, in order to comply with the statute, I have specifically described one embodiment which my invention may assume in practice, it will be understood that the same may be modified and embodied in various other forms without departing from its spirit, and that it is my intention to include all such modifications and embodiments within the scope of the appended claims.

What I claim is:

1. A pipe coupling comprising co-operating connections each carrying a compressible gasket projecting beyond an end surface thereof and each also having a pivot means co-operating with the pivot means on the other and acting on a transverse axis only at one side of said gaskets with the pivotal axis disposed in the plane of the gasket faces when assembled whereby the gaskets are brought into axial alinement without appreciable slipping therebetween.

2. A pipe coupling comprising co-operating connections each carrying a gasket projecting beyond an end surface thereof, pivot means on each co-operating with the pivot means on the other and acting on a transverse axis only at one side of said gaskets with the pivotal axis disposed in the plane of the gasket faces when assembled whereby the gaskets are brought into axial alinement without appreciable slipping therebetween, and co-operating interengaging lug means, lugs on said connections diametrically opposite said pivot means and automatically separable upon movement of one connection about the pivotal axis.

3. In combination, a rigid pipe section provided at one end with lug means on its top when said section is disposed in horizontal position, and a co-operating rigid pipe section having one end lug means on its top forming a transverse pivot with said lug means and engageable with said first mentioned lug means without movement of said first section and while enabling movement of the remote end of said second section about said transverse pivot from a position above said first section into co-axial relation with the latter, each of said sections carrying abutting compressible gaskets and said lug means being so disposed as to locate said pivot axis substantially in the plane of the gasket faces when the latter are assembled.

4. In combination, a rigid pipe section provided on one end with lug means on its top when said section is disposed in horizontal position, a co-operating rigid pipe section having on one end other lug means on its top forming a transverse pivot with said first mentioned lug means and engageable with said first mentioned lug means to connect said sections without movement of said first section and when the remote end of said second section is moved about said transverse pivot formed by said co-operating lug means from a position above said first section into coaxial relation with the latter, compressible packing means protruding from each section and having their faces uniformly compressed axially upon a pivotal downward movement of said second section and in their assembled position having their faces substantially in the plane of the pivotal axis, and registering lug means on the bottoms of said sections interengaging as said second section is moved downward in correct alinement and permitting separation of said sections upon only a reverse angular movement of said second section.

In testimony whereof I affix my signature.

EARL SEXTON.

CERTIFICATE OF CORRECTION.

Patent No. 1,832,054.  Granted November 17, 1931, to

EARL SEXTON.

It is hereby certified that error appears in the printed specification of the above numbered patent requiring correction as follows: Page 2, line 118, claim 1, strike out the article "a"; page 3, lines 6 and 7, claim 2, strike out the comma and word ", lugs", and line 15, claim 3, after "having" insert the word on; and that the said Letters Patent should be read with these corrections therein that the same may conform to the record of the case in the Patent Office.

Signed and sealed this 22nd day of December, A. D. 1931.

(Seal)
M. J. Moore,
Acting Commissioner of Patents.